United States Patent Office 3,109,095
Patented Oct. 29, 1963

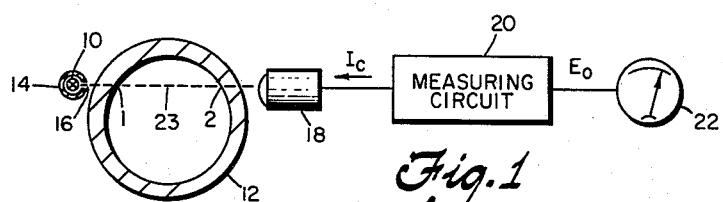
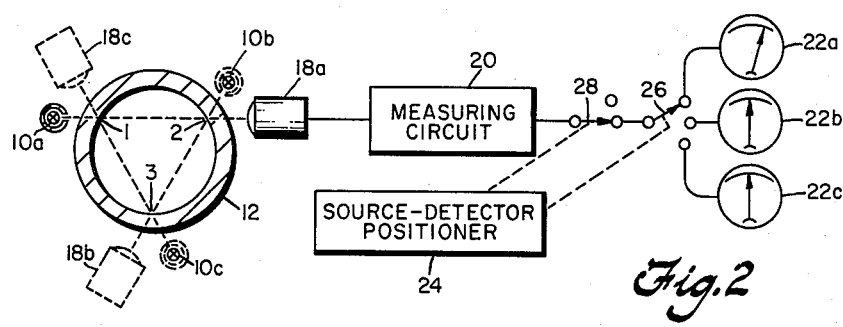
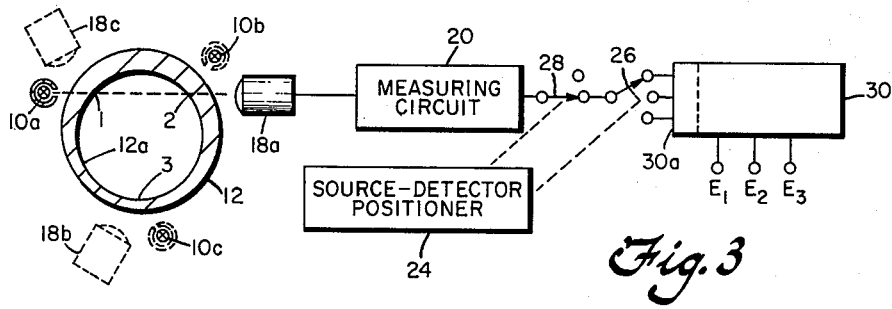
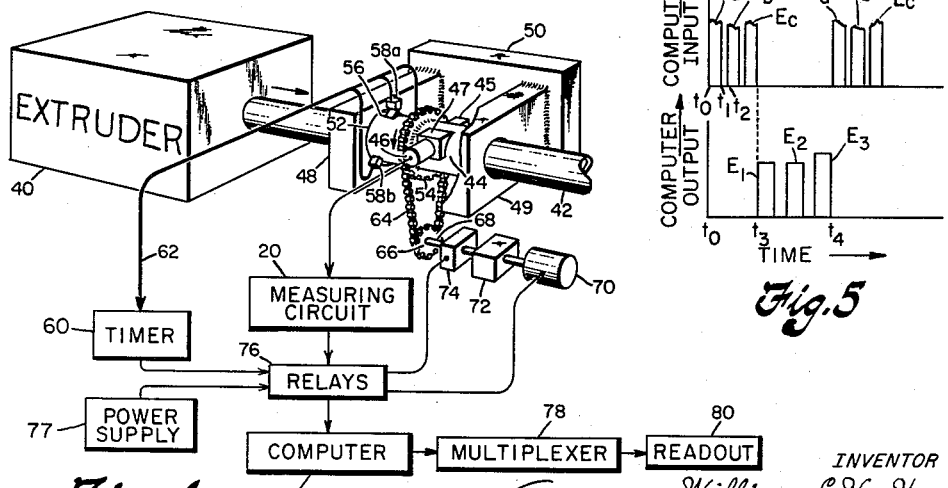

3,109,095
RADIATION TUBING GAUGE FOR COMPUTING SINGLE-WALL THICKNESSES FROM PLURAL DOUBLE-WALL THICKNESS MEASUREMENTS
William E. Van Horne, Columbus, Ohio, assignor to Industrial Nucleonics Corporation, a corporation of Ohio
Filed May 25, 1959, Ser. No. 815,395
9 Claims. (Cl. 250—83.3)

This invention relates generally to the measurement of wall thickness, and more particularly, to a novel method and means for non-destructively measuring the wall thickness of a tubular product.

It is frequently desirable to measure the wall thickness of tubing which is accessible only from the outside thereof. In certain extruding operations such as the manufacture of steel pipe, aluminum conduit or plastic tubing, the material is forced through a die to produce a continuous tube having a desired wall thickness. However, manufacturers have experienced difficulty in controlling their extruders to maintain the center hole of the extruded tubing concentric with the outer surface thereof. There is a tendency for the center hole to become eccentric with respect to the outer periphery of the tubing, whereupon the wall thickness on one side of the tubing may be significantly greater than that on the side diametrically opposite.

To check the concentricity of the tubing, it is presently necessary that the extruding process be terminated to permit removal of sample sections of tubing. By suitable calipering instruments, the wall thickness is then measured at various points around the circumference of the sample section. The extruder die and mandrel are then manually adjusted in accordance with these measurements and the process is resumed. It can be readily seen that the accuracy with which concentricity is maintained is dependent on the frequency of measurement. But, the amount of tubing extruded per unit length of time is inversely related to the number of measurements taken. Thus, the disadvantages of this destructive method of testing are apparent.

Prior to the present invention, many companies have utilized nuclear radiation gauges to measure wall thickness of a pipe, these gauges employed a radiation source and a radiation detector spaced therefrom. Usually, the radiation source and detector were placed adjacent one side of the pipe to enable a beam of radiation to pass tangentially through the wall. With this apparatus, the detector is responsive to the intensity of the transmitted beam of radiation which may be correlated to the average thickness of that portion of wall traversed by the radiation beam. The main advantage of this prior art is the provision for non-destructive measurement of pipewall thickness. However, the indication obtained may be considered only an average value of pipewall thickness which may or may not be valid at every point about the circumference of the pipe.

To overcome the limitations and disadvantages imposed by the prior art, the present invention provides a unique radiation gauging system for determining the single wall thickness of a length of tubing at one or more discrete points on the circumference thereof. In the preferred embodiment, multiple radiation source-detector units are successively positioned in different measurement positions about the tubing, each position being angularly displaced by a fixed amount. In each measurement position, the path of radiation describes a chord intersecting the tube in two points. A signal is obtained at each measuring position which always represents the sum of the wall thickness at any two of the discrete points. By feeding the distinct signals thus obtained to an analog computer, there is provided an electrical analog output indicative of the single wall thickness at each measuring point. The separate analog outputs may be utilized by any one of several well-known expedients to provide a continuous recording of each thickness value, or they may be converted to error signals whereby automatic control of said pipewall thickness may be effected by suitable adjustments to the extruding apparatus.

Accordingly, it is a primary object of the present invention to provide novel method and means for measuring the single wall thickness of a tubular product at one or more discrete points about its circumference.

It is another object of the present invention to provide an improved tube-wall thickness gauge which is capable of more accurate measurements than similar devices used heretofore.

It is also an object of the present invention to provide a tube-wall thickness gauge which may be readily adapted to control an industrial extruding process.

It is still another object of the present invention to provide a tube-wall thickness gauge the measurement accuracy of which does not depend on the visual interpretation of a human operator.

It is yet another object of the present invention to provide a tube-wall thickness gauge which is capable of continuous non-destructive measurement of a traveling tube.

It is an additional object of the present invention to provide a tube-wall thickness gauge which is completely automatic and does not require the manual dexterity essential to the operation of prior art devices.

Besides the above objects, there are numerous other advantages as well as several attractive features of the present invention which will become apparent from the following specification when taken in conjunction with the appended drawings in which:

FIG. 1 is a simplified diagrammatic view of a radiation gauge for measuring a tubular product shown for purposes of explaining the operation of the present invention;

FIG. 2 is a diagrammatic view illustrating alternate positions of the radiation gauge shown in FIG. 1;

FIG. 3 is a simplified diagrammatic view illustrating the essential concept of the present invention;

FIG. 4 is a detailed perspective view of a plastic extrusion process comprising a preferred embodiment of the present invention; and FIG. 5 is a timing diagram illustrating the sequencing of the operation of the preferred embodiment.

With reference now to the drawings, the basic principle of the transmission type radiation gauge is shown in FIG. 1. A source 10 of penetrative radiation, such as radium, is placed at one side of a tube 12 to be measured. The radiation source 10 is preferably disposed within a shield 14 with an aperture 16 adjacent the exterior of tube 12. On the opposite side of tube 12 in alignment with the aperture 16, there is disposed a radiation detector 18 such as an ionization chamber or a Geiger-Müller tube. A measuring circuit 20 is interconnected with the detector 18 and an indicator 22.

Gamma rays from the source 10 pass into the tube 12 at a point 1 and emerge from the tube at a point 2 on the opposite side thereof. The dotted line 23 may represent the path of the radiation flux. The intensity of the emergent beam is measured by the detector 18 located at the latter point. Part of the incident radiation will be absorbed by the walls of the tube 12, the amount being dependent on the total wall thickness traversed by the radiation beam, and the greater the combined thickness the less will be the detector response. The detector 18 generates a flow of current $I_c$ proportional to the unattenuated radiation emerging from the tube at point 2. From the current $I_c$, measuring circuit 20 is utilized to produce an output voltage $E_o$ to which the indicator 22 is responsive. The scale of indicator 22 may be calibrated in units of wall thickness. However, the output voltage $E_o$ will be a function of the sum of the tube wall thickness at points 1 and 2. Therefore, the thickness value indicated at 22 may be considered only an average value of wall thickness which may or may not be the actual wall thickness at the points of measurement.

The present invention proposes that a measurement be taken at three different points about tube 12 in such a manner that each measurement represents the sum of the tube wall thickness at any two of the three points. For convenience, the points of measurement are equally spaced from one another on the tube 12; however, they may be any three points randomly selected as long as the above requirement is met.

Referring to FIG. 2, to accomplish this, a source-detector positioner is generally shown at 24. Through suitable drive means, the positioner 26 is operative to step-position the source 10 and detector 18 about the tube 12 while maintaining their mutual geometrical relationship. In a preferred manner, the angular rotation of the source and detector between successive measuring positions is fixed by the positioner 24 at 120 degrees. A three position switch 26 is mechanically linked to the source-detector positioner 24 and serves to connect the output of the measuring circuit 20 to a plurality of indicators 22a, 22b and 22c. Another switch 28 is mechanically linked to the positioner 24 and is operative to disconnect the output of the measuring circuit 20 while the source and detector are moving between measuring positions.

Initially, the apparatus is shown in a measuring position wherein the source and detector elements are respectively designated by the reference numerals 10a and 18a. Measuring circuit 20 develops an output voltage $E_a$ correlatable to the combined tube-wall thicknesses at points 1 and 2. This potential is indicated at 22a.

After a predetermined time sufficient to obtain a reliable indication at 22a, the positioner 24 disconnects the measuring circuit at 28 and moves the source and detector to the positions indicated respectively in dotted outline at 10b and 18b and repositions the arm of switch 26 to engage indicator 22b. When this position is attained by the source and detector, switch 28 is closed. In this second measuring position, the radiation beam passes into the tube 12 at measurement point 2 and emerges at a third measurement point 3. Now, a voltage $E_b$ is developed which is a function of the combined tube wall thicknesses at points 2 and 3. This voltage may be noted at 22b.

Whereupon, the source and detector assume the positions shown respectively in dotted outline at 10c and 18c comprising a third measuring position. Measuring circuit 20 develops a voltage $E_c$ which is a function of the combined tube-wall thicknesses at measurement points 1 and 3. In a similar manner, the output voltage $E_c$ may then be read on indicator 22c.

Thus, the output voltages $E_a$, $E_b$ and $E_c$ can be expressed mathematically in terms of the single wall-thickness at each of the three measurement points and the voltages are so interrelated that a system of linear equations in the three unknown thicknesses can be formulated. This linear system can be adapted for solution by a computer such as shown in FIG. 3. Referring now to FIG. 3, the output of the measuring circuit 20 is switched at 26 to the input of a computer 30 in accordance with the position of the source and detector. By means of switch 28, the signal voltages $E_a$, $E_b$ or $E_c$ are applied to the computer 30 only when the radiation source 10 and detector 18 are located in one of the three measuring positions. Each of the signal voltages are stored in a memory unit 30a of computer 30 for later computation. After the three voltages $E_a$, $E_b$ and $E_c$ are presented thereto, computer 30 functions to provide three separate electrical analog outputs $E_1$, $E_2$ and $E_3$, each of which is indicative of the tube-wall thickness at the respective measuring points 1, 2 and 3. The construction of computer 30 will be obvious to one skilled in the electrical art. Accordingly, further detailed description of the same is considered unnecessary and is herein omitted.

It should be realized that it would also be within the scope of the present invention to employ three separate sources and detectors and fixedly arrange them in each of the positions assumed by the single source and detector shown by way of example. In this case, separate measuring circuits would be required; however, the computer 30 could then be simplified and adapted for continuous readout of the unknown thickness quantities.

For purposes of apt illustration, it may be assumed that the inner hole 12a of tube 12 is not concentric with the outer surface thereof, and further that its geometric center is displaced toward measurement point 3. Due to the increased absorber along measurement path 1—2, it may be observed that the magnitude of output voltage $E_a$ may be significantly less than the magnitudes of either $E_b$ or $E_c$. It may also be readily apparent that if the concentricity of the tube 12 must be checked, a single external measurement will not suffice. If three discrete interrelated measurements are taken and analyzed by computer 30, the concentricity of tube 12 may be determined. If this is done, the magnitudes of the analog outputs $E_1$ and $E_2$ will be substantially equal; but, the magnitude of analog output $E_3$ will indicate a minimum wall thickness at measurement point 3.

The utilitarian aspects of the present invention will be obvious from the ensuing description of the embodiment shown in FIG. 4. In FIG. 4, an industrial extruding process is represented generally at 40. As an example, the process 40 may be adapted to produce a continuous length of plastic tube 42 traveling in the direction indicated by the arrow. In view of the structural advantages, it is desirable that the wall thickness of tube 42 be equal at every point around said tube. In practice, due to various shortcomings of the extruder 40, it has been difficult to obtain circumferential uniformity in wall thickness of tube 42. Adjustments to the extruder 40 were made by operating personnel who heretofore had to rely on visual observations made by periodically sampling sections of the output tube 42.

The present invention teaches a measuring system based on the hereinabove-described principles which provides operating personnel with a continuous record of the wall thickness of tube 42 at one or more points about its circumference. Basically, the radiation source and detector are mounted on a revolving sleeve 44 spaced from the traveling tube 42. The source 10 is enclosed by a source holder 45 fabricated of dense shielding material such as lead to eliminate radiation hazards to operating personnel. However, the radiation aperture 16 (not shown in FIG. 4) extends toward the tube 42 to allow a useful beam of radiation to be directed in the manner set forth hereinabove. The source holder 45 should be rigidly mounted on sleeve 44 and secured by suitable lock means to prevent access thereto by unauthorized personnel. In view of the density of the source holder it may be necessary to place weights on the sleeve 44 diametrically opposite the same to counterbalance the assembly.

On the sleeve 44 in the same transverse plane as the radiation source 10, an ionization chamber 46 is mounted on a block of insulative material 47. An opening is provided in the sleeve 44 adjacent the window of the chamber 46 to permit unabsorbed radiations emanating from the tube 42 to enter said chamber and produce the well-known electrical response. It should be noted that the transverse plane in which the radiation source and detector are placed is normal to the direction of transport of the tube 42. Since the methods of mechanically mounting the source and detector on the sleeve 44 will be familiar to those skilled in the art, details thereof are herein omitted.

The sleeve 44 is rotatably mounted in a pair of spaced end plates 48 and 49 welded to a stationary support 50. An annular groove 52 is milled in each end plate to accommodate the sleeve 44. Suitable bearings may be provided in the grooves 52 to enable the sleeve 44 to rotate easily therein. Grooves 52 should be cut as close as physically possible to the tube 42 to position the source and detector near the tube 42 and thereby increase the sensitivity of the radiation measuring system. A large sprocket 54 is rigidly mounted about the sleeve 44 substantially in the center thereof. An actuator arm 56 is also mounted on the sleeve 44 and is adapted to engage a plurality of limit switches 58a, 58b and 58c (not visible in FIG. 4). Each of the limit switches are mounted adjacent the groove 52 and spaced 120 degrees apart. The limit switches 58a, 58b and 58c are connected to a timer 60 by an electrical cable 62.

To rotate the sleeve 44, a roller chain 64 is trained around the large sprocket 54 and a drive sprocket 66. Sprocket 66 is connected to a drive axle 68 driven by a two-phase synchronous motor 70 through a gear box 72 and an electric clutch arrangement shown generally at 74. For purposes of explanation, the drive system shown is operative to rotate the sleeve in a counter-clockwise direction as viewed in FIG. 4 and denoted by the arcuate arrow.

The drive system is interconnected by means of a relay circuit 76 with the timer 60 and a power supply 77 to step-position the sleeve 44 in a manner described hereinafter. Relay circuit 76 is also interconnected with the measuring circuit 20 and computer 30 to perform the functions of switches 28 and 26 shown in FIG. 3. A multiplexer 78 serves to connect the analog outputs of computer 30 to a readout unit 80. Although timing and switching circuits are not illustrated schematically, the construction of the same should be apparent to those skilled in the art upon reference to the timing diagram of FIG. 5 and the following description of operation.

In the operation of the preferred embodiment, it is initially assumed that the sleeve 44 is located as shown in FIG. 4, viz., the first measuring position. Since it is preferred that motor 70 be continuously running, clutch 74 is disengaged to maintain sleeve 44 in position. It may be desirable to employ an automatic brake means on the drive axle 68 to prevent slippage of the sleeve from the measuring position. Measuring circuit 20 is connected by relay network 76 to the computer 30.

Referring now to FIG. 5, it may be observed that the signal voltage $E_a$ is presented to the computer input during the time interval $t_0$—$t_1$. The time interval of measurement is set by timer 60 and is determined by the parameters of the radiation measurement system.

At time $t_1$, timer 60 disconnects the measuring circuit 20 from the computer 30 and engages the clutch 74. Sleeve 44 rotates until the actuator arm 56 strikes the limit switch 58b. Whereupon the clutch 74 is disengaged and the signal voltage $E_b$ is presented to the computer 30 at time $t_2$.

Similarly, sleeve 44 again rotates until stopped by the limit swtch 58c; a third measurement is taken wherein the voltage $E_c$ is transmitted to computer 30. Having accumulated data at the three points of measurement, the computer 30 proceeds to solve for the unknown thickness quantities in terms of electrical analogs.

At time $t_3$, timer 60 directs relays 76 to sequentially disconnect the measuring circuit 20 from the computer 30, reverse synchronous motor 70 and engage the clutch 68. Thus, the sleeve 44 counter-rotates until the actuator arm 56 strikes the limit switch 58a. Immediately, clutch 68 is disengaged and motor 70 is reversed to prepare for a new measuring cycle.

The interval of return, $t_3$ to $t_4$, is used to readout the analog outputs $E_1$, $E_2$ and $E_3$ produced by computer 30. During this time, the multiplexer 78 sequentially connects the individual outputs of computer 30 to the readout device 80. Although the analog outputs $E_1$, $E_2$ and $E_3$ are read out successively, it may be desirable to record them simultaneously with a three pen strip chart recorder or with three separate recorders. As shown in FIG. 5, the time interval of readout is not utilized to store signals from the measuring circuit, but the computer 30 may be readily adapted to perform both functions simultaneously to provide a substantially continuous measuring and recording system.

The reversing of sleeve 44 is necessary to prevent entanglement and fouling of the detector output cable as the source-detector assembly rotates. However, valuable time lost in reversing the direction of rotation of sleeve 44 may be preserved for measurement, if a commutator arrangement is utilized. By connecting the output of the chamber 46 to a commutating element located on the sleeve 44, and the measuring circuit 20 to pickups spaced around the sleeve 44 on the end plate 49, it would be possible to continually rotate the source-detector assembly in one direction.

The hereinabove-described measuring system is representative of only one of numerous applications for the present invention. The embodiment illustrated herein should not be regarded in a limiting sense, since numerous additions, changes and substitutions may be made therein without detracting from the original spirit and scope of the invention or relinquishing any of the advantages attendant thereto.

What is claimed is:

1. Apparatus for measuring the single-wall thickness of a tube in accordance with the radiation absorption of double-wall thicknesses thereof at at least three points equally spaced on the circumference of said tube comprising a radioactive source for providing a beam of penetrative radiation, a radiation detector, means for mounting said radioactive source to direct said beam of radiation through the wall of said tube along a path determined by a pair of said points and for mounting said detector to receive radiation penetrating said wall at both of said pair of points, means for revolving said mounting means about said tube and for successively positioning said mounting means to direct said beam of radiation through said wall at each of said points twice, each time also penetrating said wall at a different one of the other of said points, measuring circuit means connected to said radiation detector for developing an intensity-proportional signal indicative of the combined wall thickness of said tube between each pair of said points traversed by said beam of radiation, a memory circuit, means for coupling each of said electrical signals to said memory circuit for storing the same, a computer for combining all of said stored electrical signals to produce first, second and third analog voltages indicative of the single-wall thickness at each of said points, and means for indicating said first, second and third analog voltages.

2. Apparatus substantially as set forth in claim 1, in which said source-detector positioning means includes means for disconnecting said measuring circuit means from said memory circuit when said mounting means is revolving between successive measuring positions.

3. Apparatus for measuring the single-wall thickness of a tube in accordance with the radiation absorption of double-wall thicknesses thereof at at least three points equally spaced on the circumference of said tube comprising a radioactive source for providing a beam of radiation, a radiation detector, a cylindrical sleeve, means for mounting said radioactive source and said detector on the outer periphery of said sleeve, means for concentrically mounting said sleeve around said tube to direct said beam of radiation through the wall of said tube along a path determined by a pair of said points and to detect radiation penetrating said wall at both of said pair of points, means for successively positioning said sleeve about said tube to direct said beam of radiation through said wall at each of said points twice, each time also penetrating said wall at a different one of the other of said points, circuit means connected to said radiation detector for developing an intensity-proportional electrical signal indicative of the combined wall thickness of said tube between each pair of said points traversed by said beam of radiation, a memory circuit for storing said electrical signal, a computer for combining all of said stored electrical signals to produce first, second, and third analog voltages indicative of the single-wall thickness at each of said three points, and means for indicating said first, second and third analog voltages.

4. Apparatus substantially as set forth in claim 3 in which said source-detector positioning means includes means for disconnecting said measuring circuit means from said memory circuit when said sleeve is revolving between successive measuring positions.

5. Apparatus for measuring the single-wall thickness of a tube in accordance with the radiation absorption of double-wall thicknesses thereof at at least three points equally spaced on the circumference of said tube comprising a radioactive source for providing a beam of radiation, a radiation detector, a cylindrical sleeve, a mounting bracket for said sleeve comprising a pair of spaced plates each having an opening in horizontal alignment for receiving said tube, an annular groove milled in inwardly directed faces of said spaced plates about said opening, and means for rotatively mounting said sleeve in said annular grooves; means for mounting said radioactive source and detector on the outer periphery of said sleeve to direct said beam of radiation into said tube along a path determined by a pair of said points and to detect radiation penetrating said tube, drive means, means for periodically connecting said drive means to said sleeve to successively reposition said sleeve about said tube to direct said beam of radiation into said tube at each of said points, measuring circuit means connected to said radiation detector for developing an intensity-proportional signal indicative of the combined wall thickness of said tube between each pair of said points traversed by said beam of radiation, a memory circuit, switching means responsive to the position of said sleeve in said groove for coupling each of said electrical signals to said memory circuit for storing the same, a computer for combining all of said stored electrical signals to produce first, second, and third analog voltages indicative of the single-wall thickness at each of said three points, and means for indicating said first, second, and third analog voltages.

6. Apparatus substantially as set forth in claim 5 in which said switching means includes means for disconnecting said measuring circuit means from said memory circuit when said sleeve is rotating.

7. Apparatus for measuring the single-wall thickness of a tube in accordance with the radiation absorption of double-wall thicknesses thereof at at least three points equally spaced on the circumference of said tube comprising a radioactive source for providing a beam of radiation, a radiation detector, a cylindrical sleeve, a mounting bracket for said sleeve comprising a pair of spaced plates each having an opening in horizontal alignment for receiving said tube, an annular groove milled in inwardly directed faces of said spaced plates about said opening, and means for rotatively mounting said sleeve in said annular grooves; means for mounting said radioactive source and detector on the outer periphery of said sleeve to direct said beam of radiation into said tube along a path determined by a pair of said points and to detect radiation penetrating said tube, actuator means connected to said sleeve for rotating said sleeve about its longitudinal axis, a power source for energizing said actuator means, means for controlling the operation of said actuator means including an actuator arm mounted on the periphery of said sleeve, three limit switches equally spaced about said rotating sleeve and adapted to be actuated by said arm, and a timer; means for interconnecting said limit switches and said timer with said power source and said actuator means to periodically de-energize said actuator means, said sleeve being successively positioned at 120 degree intervals about said tube to direct said beam of radiation into said tube at each of said points, measuring circuit means connected to said radiation detector for developing an intensity-proportional signal indicative of the combined wall thickness of said tube between each pair of said points traversed by said beam of radiation, a memory circuit, means responsive to said limit switches for coupling each of said electrical signals to said memory circuit for storing the same, a computer for combining all of said stored electrical signals to produce first, second and third analog voltages indicative of the single-wall thickness at each of said three points, and utilization means for said first, second, and third analog voltages.

8. Apparatus substantially as set forth in claim 7 in which said actuator means comprises a reversible motor for counter-rotating said sleeve when said radiation beam has traversed all of said pairs of points.

9. Apparatus for measuring the single-wall thickness of a tube in accordance with the radiation absorption of double-wall thicknesses thereof at at least three points spaced on the circumference of said tube comprising means including a radioactive source for passing a beam of penetrative radiation through the wall of said tube along a line determined by a pair of said points, means for quantitatively detecting the radiation penetrating said wall at said pair of points by generating a signal systematically related to said detected radiation, means for repeating said operation for different pairs of said points so that radiation penetrating said wall at each point is detected twice, each time after penetrating the wall at a different one of the other of said points, and means for combining said signals to produce signals indicative of the single-wall thickness at each of said points.

References Cited in the file of this patent

UNITED STATES PATENTS

| | | |
|---|---|---|
| 2,298,942 | Hicks | Oct. 13, 1942 |
| 2,349,429 | Herzog | May 23, 1944 |
| 2,525,292 | Fua et al. | Oct. 10, 1950 |
| 2,687,477 | Pfaff | Aug. 24, 1954 |
| 2,748,290 | Reichertz | May 29, 1956 |
| 2,885,557 | Kizaur | May 5, 1959 |
| 2,920,206 | Heller | Jan. 5, 1960 |
| 2,922,884 | Fearnside | Jan. 26, 1960 |

FOREIGN PATENTS

| | | |
|---|---|---|
| 547,196 | Belgium | May 15, 1956 |